US012665822B2

(12) United States Patent
Butler

(10) Patent No.: US 12,665,822 B2
(45) Date of Patent: *Jun. 23, 2026

(54) USER EQUIPMENT HOSTING FOR CUSTOMIZABLE 5G SERVICES

(71) Applicant: T-Mobile USA, Inc., Bellevue, WA (US)

(72) Inventor: Robert Butler, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,968

(22) Filed: Aug. 30, 2023

(65) Prior Publication Data

US 2024/0064070 A1     Feb. 22, 2024

Related U.S. Application Data

(63) Continuation of application No. 17/693,099, filed on Mar. 11, 2022, now Pat. No. 11,765,052.

(51) Int. Cl.
| | |
|---|---|
| *H04L 41/5041* | (2022.01) |
| *H04L 41/0806* | (2022.01) |
| *H04L 41/0895* | (2022.01) |

(52) U.S. Cl.
CPC ...... *H04L 41/5041* (2013.01); *H04L 41/0806* (2013.01); *H04L 41/0895* (2022.05)

(58) Field of Classification Search
None
See application file for complete search history.

(56) References Cited

U.S. PATENT DOCUMENTS

| | | | |
|---|---|---|---|
| 5,915,008 | A | 6/1999 | Dulman |
| 5,978,672 | A | 11/1999 | Hartmaier et al. |
| 6,181,935 | B1 | 1/2001 | Gossman et al. |
| 6,452,915 | B1 | 9/2002 | Jorgensen |
| 6,590,885 | B1 | 7/2003 | Jorgensen |
| 6,594,246 | B1 | 7/2003 | Jorgensen |
| 6,680,922 | B1 | 1/2004 | Jorgensen |

(Continued)

FOREIGN PATENT DOCUMENTS

| | | |
|---|---|---|
| DE | 112015003686 T5 | 4/2017 |
| EP | 0990329 A1 | 4/2000 |

(Continued)

*Primary Examiner* — Scott B Christensen
(74) *Attorney, Agent, or Firm* — Perkins Coie LLP

(57)     ABSTRACT

A service provider of a telecommunications network provides local hosting of virtual user equipment (UE) clients to enable the clients to access locally access services of the telecommunications network's control plane. The service provider deploys a virtual UE client on a computing device associated with the service provider, where the virtual UE client includes computer program instructions that when executed by the computing device cause the computing device to perform one or more functions simulating performance of a physical UE device. The service provider maintains an interface between the virtual UE client and the control plane by which the client receives data from the control plane. The virtual UE client executes an application generated by a customer, which performs one or more functions using the data received from the control plane of the telecommunications network.

20 Claims, 6 Drawing Sheets

(56) References Cited

U.S. PATENT DOCUMENTS

| | | | |
|---|---|---|---|
| 6,681,232 B1 | 1/2004 | Sistanizadeh et al. | |
| 6,757,268 B1 | 6/2004 | Zendle | |
| 6,778,517 B1 | 8/2004 | Lou et al. | |
| 6,795,701 B1 | 9/2004 | Baker et al. | |
| 6,834,341 B1 | 12/2004 | Bahl et al. | |
| 6,862,622 B2 | 3/2005 | Jorgensen | |
| 6,865,170 B1 | 3/2005 | Zendle | |
| 6,912,230 B1 | 6/2005 | Salkini et al. | |
| 6,920,502 B2 | 7/2005 | Araujo et al. | |
| 6,954,790 B2 | 10/2005 | Forsloew | |
| 7,010,002 B2 | 3/2006 | Chow et al. | |
| 7,032,241 B1 | 4/2006 | Venkatachary et al. | |
| 7,127,261 B2 | 10/2006 | Van | |
| 7,246,149 B2 | 7/2007 | Dowling | |
| 7,299,069 B2 | 11/2007 | Claussen | |
| 7,305,240 B2 | 12/2007 | Chou et al. | |
| 7,444,669 B1 | 10/2008 | Bahl et al. | |
| 7,489,672 B2 | 2/2009 | Chitrapu et al. | |
| 7,616,598 B2 | 11/2009 | Chang et al. | |
| 7,634,230 B2 | 12/2009 | Ji et al. | |
| 7,640,008 B2 | 12/2009 | Gallagher et al. | |
| 7,843,900 B2 | 11/2010 | Gallagher et al. | |
| 7,853,264 B1 | 12/2010 | Oh | |
| 7,899,451 B2 | 3/2011 | Hu et al. | |
| 7,991,903 B2 | 8/2011 | Sabat et al. | |
| 8,041,335 B2 | 10/2011 | Khetawat et al. | |
| 8,060,084 B2 | 11/2011 | Buckley et al. | |
| 8,184,644 B1 | 5/2012 | Chen et al. | |
| 8,190,191 B2 | 5/2012 | Livet et al. | |
| 8,204,042 B2 | 6/2012 | Anschutz et al. | |
| 8,305,965 B2 | 11/2012 | Shen et al. | |
| 8,498,223 B2 | 7/2013 | Kavanaugh | |
| 8,503,393 B2 | 8/2013 | Vesterinen | |
| 8,700,026 B2 | 4/2014 | Behairy et al. | |
| 8,730,796 B2 | 5/2014 | Samuel et al. | |
| 8,817,696 B2 | 8/2014 | Grayson et al. | |
| 8,976,677 B2 | 3/2015 | Novak et al. | |
| 9,380,611 B2 | 6/2016 | Lin et al. | |
| 9,386,618 B2 | 7/2016 | Al-Shalash | |
| 9,596,707 B2 | 3/2017 | Zhu et al. | |
| 9,736,700 B1 | 8/2017 | Douberley et al. | |
| 9,743,341 B2 | 8/2017 | Pinheiro et al. | |
| 9,813,456 B2 | 11/2017 | Gu et al. | |
| 10,084,643 B2 | 9/2018 | Zhang et al. | |
| 10,187,928 B2 | 1/2019 | Karandikar et al. | |
| 10,212,578 B2 | 2/2019 | Siow et al. | |
| 10,225,746 B2 | 3/2019 | Mohammed et al. | |
| 10,278,159 B2 | 4/2019 | Chen et al. | |
| 10,425,491 B2 | 9/2019 | Bugenhagen et al. | |
| 10,492,204 B2 | 11/2019 | Kakinada et al. | |
| 10,555,171 B2 | 2/2020 | Zaks et al. | |
| 10,574,322 B2 | 2/2020 | Ercan et al. | |
| 10,638,449 B2 | 4/2020 | Shan | |
| 10,833,949 B2 * | 11/2020 | Liguori | H04L 41/12 |
| 11,019,528 B3 | 5/2021 | Yang et al. | |
| 11,096,119 B2 | 8/2021 | Zaks | |
| 11,102,176 B2 | 8/2021 | Zaks | |
| 11,165,641 B2 | 11/2021 | Papa | |
| 11,184,953 B2 | 11/2021 | Panchal | |
| 11,275,602 B1 * | 3/2022 | Shetty | G06F 9/45558 |
| 11,310,733 B1 * | 4/2022 | Gupta | H04W 28/16 |
| 2002/0044567 A1 | 4/2002 | Voit et al. | |
| 2003/0050041 A1 | 3/2003 | Wu | |
| 2005/0088999 A1 | 4/2005 | Waylett et al. | |
| 2005/0125547 A1 | 6/2005 | Ahonen | |
| 2005/0130611 A1 | 6/2005 | Lu et al. | |
| 2005/0250468 A1 | 11/2005 | Lu et al. | |
| 2006/0003760 A1 | 1/2006 | Li et al. | |
| 2006/0246899 A1 | 11/2006 | Buckley et al. | |
| 2007/0121540 A1 | 5/2007 | Sharp et al. | |
| 2008/0107092 A1 | 5/2008 | Taaghol et al. | |
| 2008/0108336 A1 | 5/2008 | Venkatachalum et al. | |
| 2009/0003831 A1 | 1/2009 | Zheng | |
| 2009/0143065 A1 | 6/2009 | Mattila | |
| 2010/0150102 A1 | 6/2010 | Li et al. | |
| 2011/0243553 A1 | 10/2011 | Russell | |
| 2011/0274087 A1 | 11/2011 | Liang et al. | |
| 2012/0246074 A1 * | 9/2012 | Annamalai | H04W 4/02 455/456.2 |
| 2014/0250215 A1 * | 9/2014 | Bowen | H04L 41/0895 709/223 |
| 2014/0297823 A1 * | 10/2014 | Prakash | H04L 41/0816 709/223 |
| 2015/0036496 A1 | 2/2015 | Shan et al. | |
| 2016/0127239 A1 | 5/2016 | Kahn et al. | |
| 2016/0139946 A1 * | 5/2016 | Gardner | G06F 9/5077 718/1 |
| 2016/0164969 A1 | 6/2016 | Li | |
| 2017/0164416 A1 | 6/2017 | Yeddala et al. | |
| 2020/0296799 A1 | 9/2020 | Barabell et al. | |
| 2020/0374263 A1 | 11/2020 | Majmundar et al. | |
| 2020/0389797 A1 | 12/2020 | Ashrafi | |
| 2021/0051540 A1 | 2/2021 | Lotfallah et al. | |
| 2022/0159501 A1 * | 5/2022 | Chou | H04L 41/122 |
| 2022/0311837 A1 * | 9/2022 | Gupta | G06F 21/577 |

FOREIGN PATENT DOCUMENTS

| | | | |
|---|---|---|---|
| EP | 1488544 A1 | 12/2004 | |
| EP | 1197040 B1 | 1/2007 | |
| EP | 1867136 A2 | 12/2007 | |
| EP | 1969774 A2 | 9/2008 | |
| EP | 1523859 B1 | 2/2018 | |
| EP | 3442167 B1 | 3/2020 | |
| EP | 3793135 A1 | 3/2021 | |
| KR | 20050098982 A | 10/2005 | |
| KR | 20060037488 A | 5/2006 | |
| KR | 100601847 B1 | 7/2006 | |
| KR | 100621329 B1 | 9/2006 | |
| KR | 100711313 B1 | 4/2007 | |
| KR | 20210109565 A | 9/2021 | |
| WO | 03101008 A1 | 12/2003 | |
| WO | 2006039851 A1 | 4/2006 | |
| WO | 2006136103 A1 | 12/2006 | |
| WO | 2007131211 A2 | 11/2007 | |
| WO | 2011137558 A1 | 11/2011 | |
| WO | 2011137559 A1 | 11/2011 | |
| WO | 2012019317 A1 | 2/2012 | |
| WO | 2014080275 A2 | 5/2014 | |
| WO | 2014116983 A1 | 7/2014 | |
| WO | 2014128690 A2 | 8/2014 | |
| WO | 2018082141 A1 | 5/2018 | |
| WO | 2018204885 A1 | 11/2018 | |
| WO | 2019029668 A1 | 2/2019 | |
| WO | 2021022919 A1 | 2/2021 | |

* cited by examiner

400

USER EQUIPMENT HOSTING FOR CUSTOMIZABLE 5G SERVICES

CROSS-REFERENCE TO RELATED APPLICATIONS

This application is a continuation of U.S. patent application Ser. No. 17/693,099, filed on Mar. 11, 2022, entitled USER EQUIPMENT HOSTING FOR CUSTOMIZABLE 5G SERVICES, which is hereby incorporated by reference in its entirety.

BACKGROUND

To comply with Service-Based Architecture standards defined for 5th Generation (5G) telecommunications services, mobile service providers deploy a control plane that facilitates enhanced customer services such as time-sensitive networking, location-based services, network slicing, and high availability. Each control plane element offers services to other control plane elements, which allow the service provider to offer advanced services to their customers. However, typically only the service provider has access to these control plane elements. While the service provider can offer services to its customers by acting as an intermediary between the control plane and the customer, the services provided by the service provider are usually generic rather than customized to the specific needs of each customer.

A customer who leases mobile network services from the service provider typically is restricted to accessing the control plane services via a user equipment device, which communicates with the control plane through one or more access networks and cannot directly access the control plane services. Thus, even if a customer desires to build an application that uses control plane data and services, the device on which the customer executes the application must communicate with the control plane over a network from a remote location, which introduces latency and impacts performance and reliability of the application.

BRIEF DESCRIPTION OF THE DRAWINGS

Detailed descriptions of implementations of the present invention will be described and explained through the use of the accompanying drawings.

Figure 1:
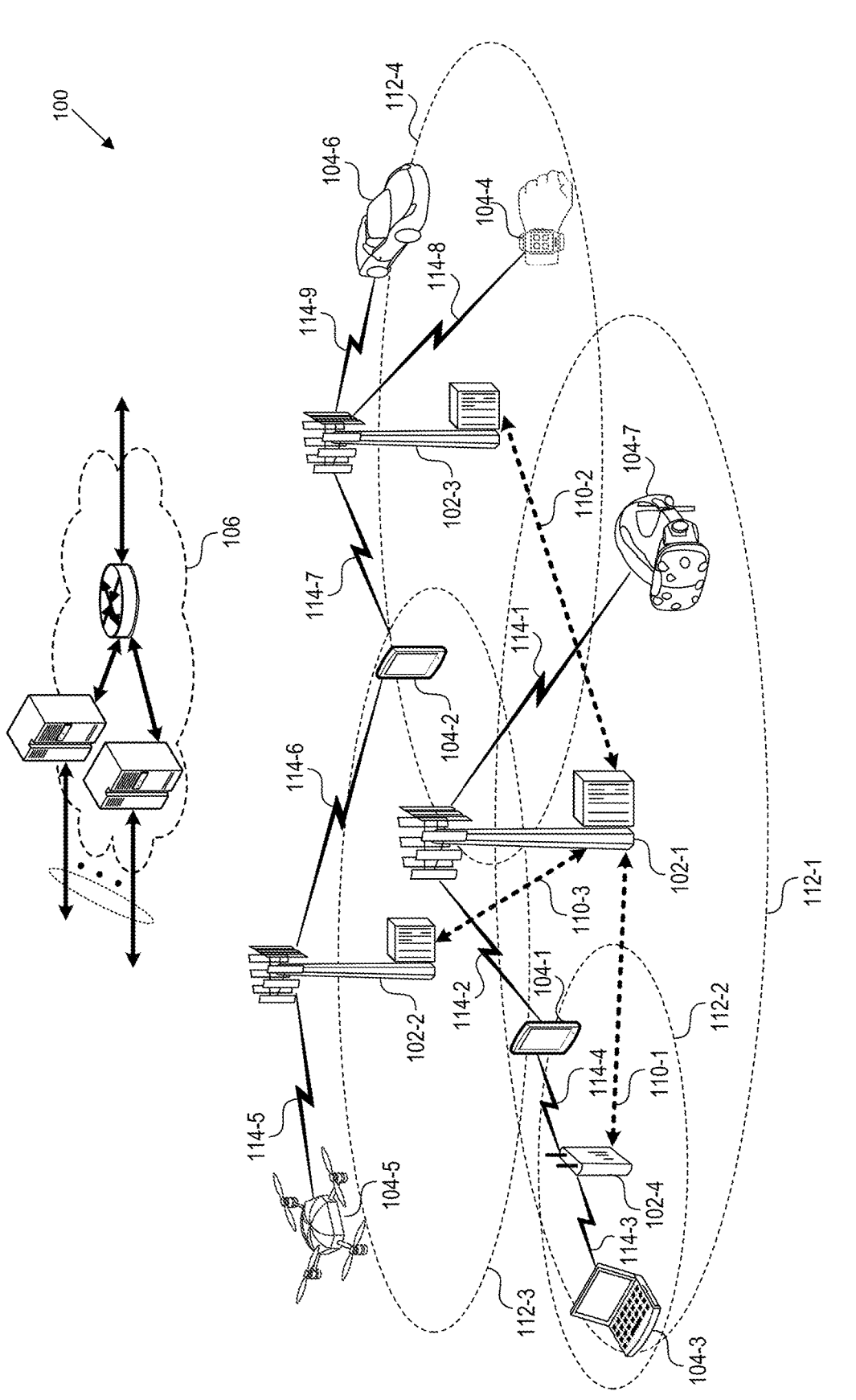
FIG. 1 is a block diagram that illustrates a wireless communications system that can implement aspects of the present technology.

The technologies described herein will become more apparent to those skilled in the art from studying the Detailed Description in conjunction with the drawings.

Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In 5G telecommunications systems, the Service-Based Architecture defined by applicable standards improves accessibility of services and data within a control plane by enabling the control plane's network functions (NFs) to communicate with each other over service-based interfaces. The resulting services and data can be used for a wide variety of applications, from general operations of the telecommunications network to specialized applications for a single telecommunications customer. However, while a service provider of the telecommunications network may enable a customer to retrieve certain types of data from the control plane, the customer typically must access such data from the control plane by retrieving the data over a data network. Such a data network introduces latency to the communications between the customer device and the control plane, and can impact performance and reliability of the customer's application.

Accordingly, the inventors have conceived of and reduced to practice systems and techniques to enable local hosting of customer's applications, giving the applications direct access to data and services of the control plane without an intermediating network. A service provider of a telecommunications network deploys a software stack (referred to herein as a "virtual user equipment (UE) client") on a computing device associated with the service provider, such as a trusted physical server or mobile device. The virtual UE client includes computer program instructions that when executed by the computing device cause the computing device to perform one or more functions simulating performance of a physical user equipment device. The service provider also maintains an interface between the virtual UE client and a control plane of the telecommunications network, which enables the UE client to receive data from the control plane without relying on an intermediating network. A customer of the telecommunications network can use the virtual UE client to execute a custom application that uses the data received from the control plane to perform functions specified by the customer.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/ gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
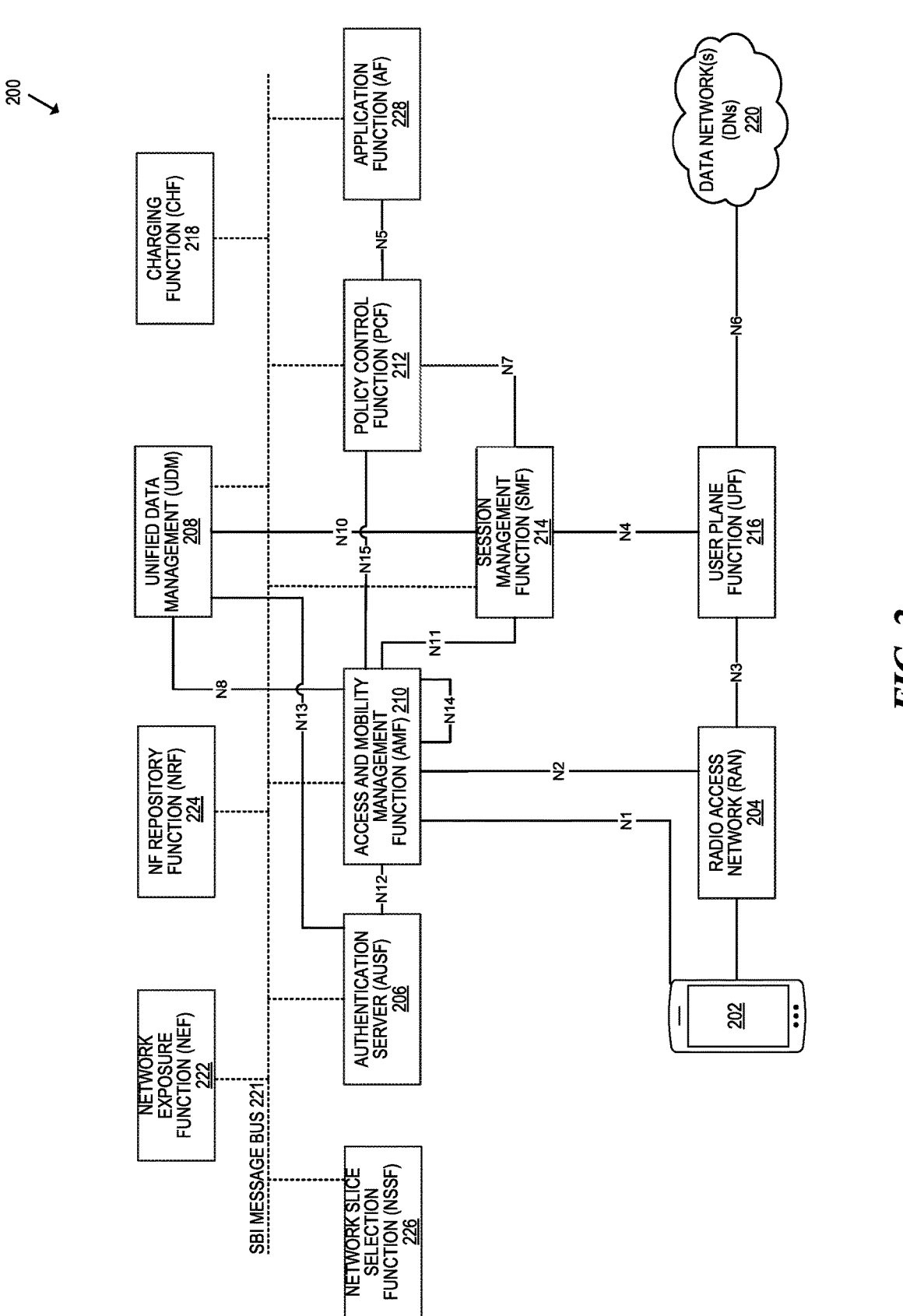
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. Collectively, the network functions that make up the control plane (referred to herein as "control plane functions") perform the signalling that establishes and maintains access to services in the telecommunications network, such as voice, text, or data services.

One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

User Equipment Hosting

The service-based architecture of 5G networks provides a wide variety of data and services. To enable customers to leverage the data and services for customized applications, a service provider of a 5G telecommunications network provides local hosting of user equipment (UE) clients that can execute customers' applications and interface directly with the control plane of the network. The applications benefit from reduced latency, improved performance, and increased security of their communications with the control plane because they are executed by the locally hosted UE clients. Developing the applications for execution by the hosted UE clients also enables customers to build the application in a familiar development environment (e.g., building for a mobile device's operating system rather than building server-side applications).

Figure 3:
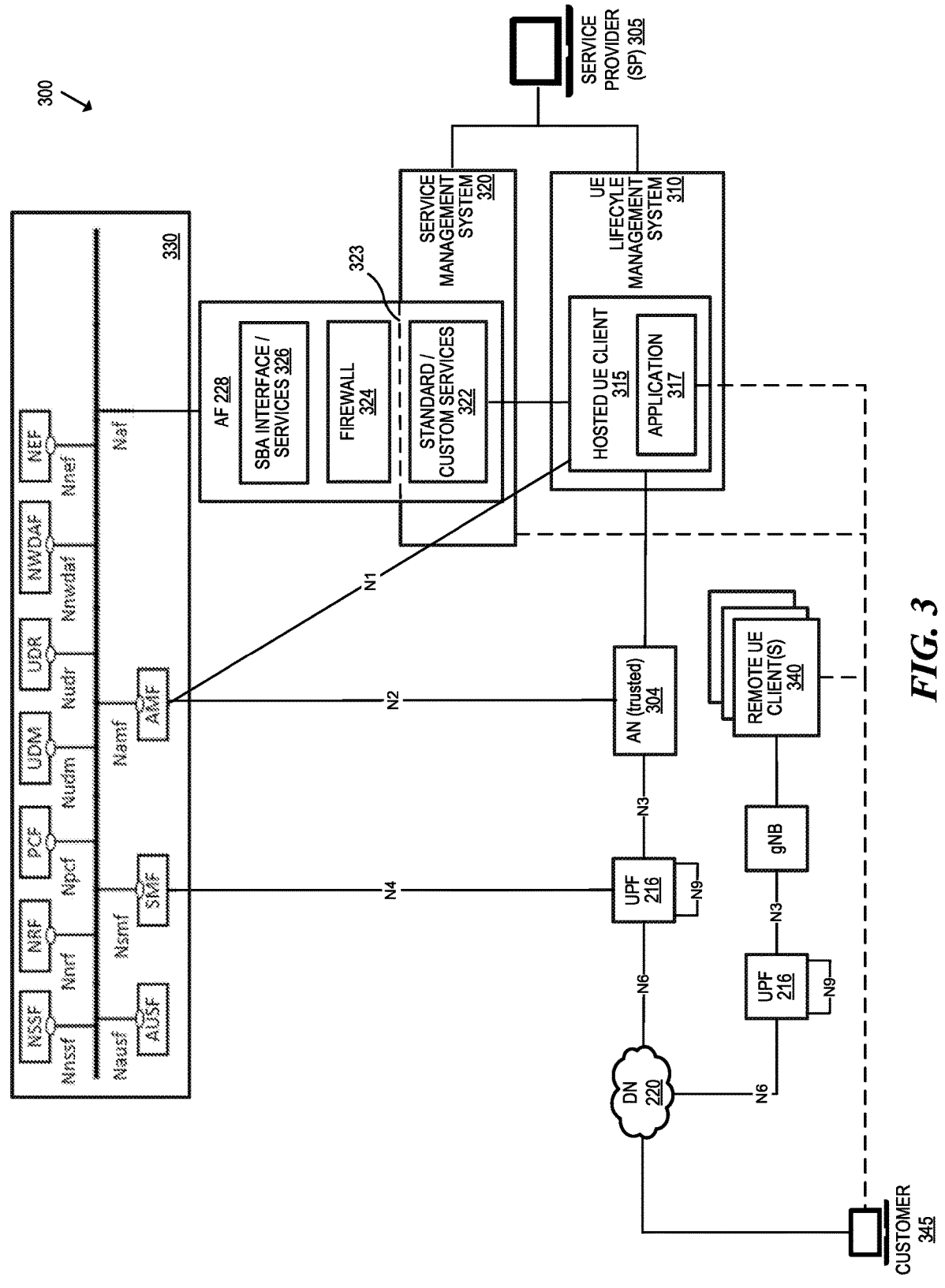
FIG. 3 is a block diagram that illustrates an architecture of an environment in which aspects of user equipment hosting are performed, according to some implementations.

FIG. 3 is a block diagram that illustrates an architecture 300 of an environment in which aspects of UE hosting are performed. The environment can include devices and 5G core NFs as described with respect to FIGS. 1 and 2. In addition, the architecture 300 can include a UE lifecycle management system 310 and a service management system 320 associated with a service provider (SP) 305. The SP 305 is an entity that maintains and manages access to a telecommunications network, such as a 5G network. For example, the SP 305 operates a control plane 330, which includes NFs similar to those described with respect to FIG. 2. The architecture 300 shown in FIG. 3 can include additional or fewer components, and functionality of the components described herein can be divided differently between the components. For example, some functions described as being performed by the UE lifecycle management system 310 can be performed by the service management system 320, or vice versa.

The UE lifecycle management system 310 deploys and manages hosted UE clients 315 within a trusted environment maintained by the SP 305. The hosted UE clients 315 represent a set of computer program instructions that are deployed for execution by one or more processors, such as a processor within a server or within a UE device (such as a mobile phone). When executed, the instructions that form each hosted UE client 315 causes the one or more processors to perform at least a subset of functions that simulate performance of a physical UE device. For example, the hosted UE client 315 is configured to send or receive data via a telecommunications access network (e.g., a trusted AN 304), process received data to compute a result, transmit results to other applications or computing devices, or perform custom functionality specified by a customer. Multiple hosted UE clients 315 operated by the lifecycle management system 310 can each have different functionality, depending on the functionality requested by the corresponding customer.

The UE lifecycle management system 310 provides an interface between the hosted UE clients 315 and the control plane 330 that enables the clients 315 to receive data directly from the control plane 330 without an intermediating network. For example, the UE lifecycle management system 310 communicatively couples the hosted clients 315 to one or more systems that regulate access to data from the control plane, such as the service management system 320. The hosted UE clients 315 can further communicate with the control plane 330 (e.g., via an AMF) by the N1 interface defined in relevant protocols.

To enable the hosted UE clients 315 to communicate directly with the telecommunications control plane 330, the hardware devices on which the lifecycle management system 310 deploys the hosted UE clients 315 (referred to herein as "host devices") are devices that meet at least a threshold level of trust. For example, the host devices include servers, mobile UE devices, or other computer hardware that is located within a trusted physical environment maintained by the SP 305 (such as a secure facility operated by the SP 305). Additionally or alternatively, the host devices include any devices that are configured to communicate with a trusted access network, such as devices that are within a coverage area of a trusted radio access node or devices that are coupled to a trusted network via a wired connection.

The UE lifecycle management system 310 spins up instances of the hosted UE clients 315 as their functionality is requested by a customer. The instances of the clients 315 are deployed to various host devices in order to satisfy quality of experience (QOE) metrics specified for customers who request access to the hosted clients. For each hosted UE client 315, the UE lifecycle management system 310 can generate a prediction of the computing resources that will be utilized by the client and select one or more host devices that are capable of executing the client while meeting the QOE metrics. The system 310 can make the prediction using any of a variety of measurements such as historical resource utilization of the particular client 315, simulation of future resource utilization based on the application code received from the customer, or resource utilization of other hosted UE clients. A model, such as a statistical model or machine learning model, can be applied to these measurements individually or in combination to estimate the resources that will be needed by the client at a given time. Based on the estimated resource utilization, the lifecycle management system 310 can select one or more host devices that has sufficient resources available for use by the client 315.

The UE lifecycle management system 310 can perform resource prediction and selection of host device(s) each time a new hosted UE client 315 is spun up. Additionally, the system 310 can monitor resource utilization as the clients 315 are executed, and thus may periodically move a client 315 from one host device to another or deploy a client 315 on additional host devices if the resource utilization of the client and available resources of the host devices warrant such a change.

In some cases, rather than dynamically selecting the host devices on which to deploy instances of the clients 315, the UE lifecycle management system 310 deploys hosted UE clients 315 on preselected host devices. For example, a given client 315 can be assigned to a particular mobile phone, such that the mobile phone executes the instructions corresponding to the client 315 whenever the client is invoked. Similarly, the UE lifecycle management system 310 may not deploy a UE client whenever the application 317 is invoked, instead enabling the application to operate within an existing client 315.

The UE lifecycle management system 310 can additionally perform back office functions such as billing, client on-boarding, and management of QOE metrics for a customer's hosted clients. Furthermore, some implementations of the lifecycle management system 310 can connect the customers who create applications 317 with other customers who might be interested in using the applications. For example, some customers may generate custom applications 317 that provide functionality to other customers, in addition to or instead of the customer who generated the application using it for their own purposes. The UE lifecycle management system 310 can match application authors to potential applications users, for example by recommending potential users to the authors or by recommending potential application authors to a potential user. The lifecycle management system 310 furthermore can intermediate the relationship between the application authors and users by, for example, handling billing, authenticating users, and controlling access to the application by authenticated users.

Each hosted UE client 315 can include an application 317, representing a set of computer-readable instructions that are executed by the host device executing the corresponding client 315. The application 317 can be provided by a customer to perform one or more defined tasks while leveraging the reduced latency or improved performance or security enabled by the hosted clients 315. For example, an application 317 can receive data from the control plane 330 (e.g., via the N1 interface) and process the data to compute a result, which can in turn be communicated to an external device such as the customer's system or a remote UE client 340.

The service management system 320 facilitates communication between the hosted UE clients 315 and a control plane 330 of the telecommunications network maintained by the SP 305. In particular, the service management system 320 maintains an interface 323 with an AF 228 of the control plane 330 to provide control plane services to the hosted UE clients 315. The AF 228 facilitates access to data and services of the control plane 330 by applications in the telecommunications network, whether the application 317 executed by a hosted UE client 315, an application generated by the service provider, or an application operated by a customer from a remote device across an access network. For example, the AF 228 can include a service-based architecture (SBA) interface or services block 326, which includes a set of application programming interfaces (APIs) that can be used to retrieve data from the control plane 330. The AF 228 can further include a firewall 324 to validate data transmitted into or out of the control plane 330. The interface 323 between the service management system 320 and the AF 228 can include a set of APIs that are configured to authenticate an application to the AF 228 and enable communication of data to or from the control plane.

The service management system 320 includes a services block 322 that processes data received from the control plane 330 for use by the application 317. The services block 322 can execute one or more standard applications that retrieve and/or process some preselected types of data from the control plane 330. Additionally, the services block 322 can enable customers to specify the types of data that are retrieved or processed by the service management system 320, optionally by deploying their own applications on the services block 322, in order to access the data that is needed for the customer's hosted UE application 317. Example types of data retrieved from the control plane include locations of remote mobile devices, status of devices (e.g., whether connected to a network or unavailable), or data associated with a device's telecom traffic (e.g., time of last data session, duration of last data session, average duration of data sessions in the last week, identity of RAN node(s) that handled the last data session, or most commonly used RAN node).

The services block 322 can include automated methods to onboard customers who use the hosted UE clients 315, support custom applications built by the customers, and ensure that the customers have access to control plane data associated with the correct remote devices. For example, if a hosted application 317 is designed to process data associated with a customer's remote devices (e.g., mobile devices in use by employees of the customer), the hosted application 317 will need access to the data associated with the customer's remote devices but should not have access to data associated with UEs that are not affiliated with the customer. The services block 322 can further support the customer's application 317 software stack, such as by ensuring the application 317 has access to and interfaces appropriately with the desired control plane data and by managing quality of experience metrics for the customer.

The hosted UE clients 315 can communicate outputs of the application 317 to any of a variety of remote devices, such as remote UE clients 340 or a customer's system 345. The remote UE clients 340 can include UE devices, such as mobile phones, as well as any of a variety of computing devices that execute the set of computer program instructions that cooperate with UE clients 315. However, unlike the hosted UE clients 315, the remote UE clients 340 communicate with other devices—including those devices implementing the control plane 330—via one or more networks such as the data network 220.

Figure 4:
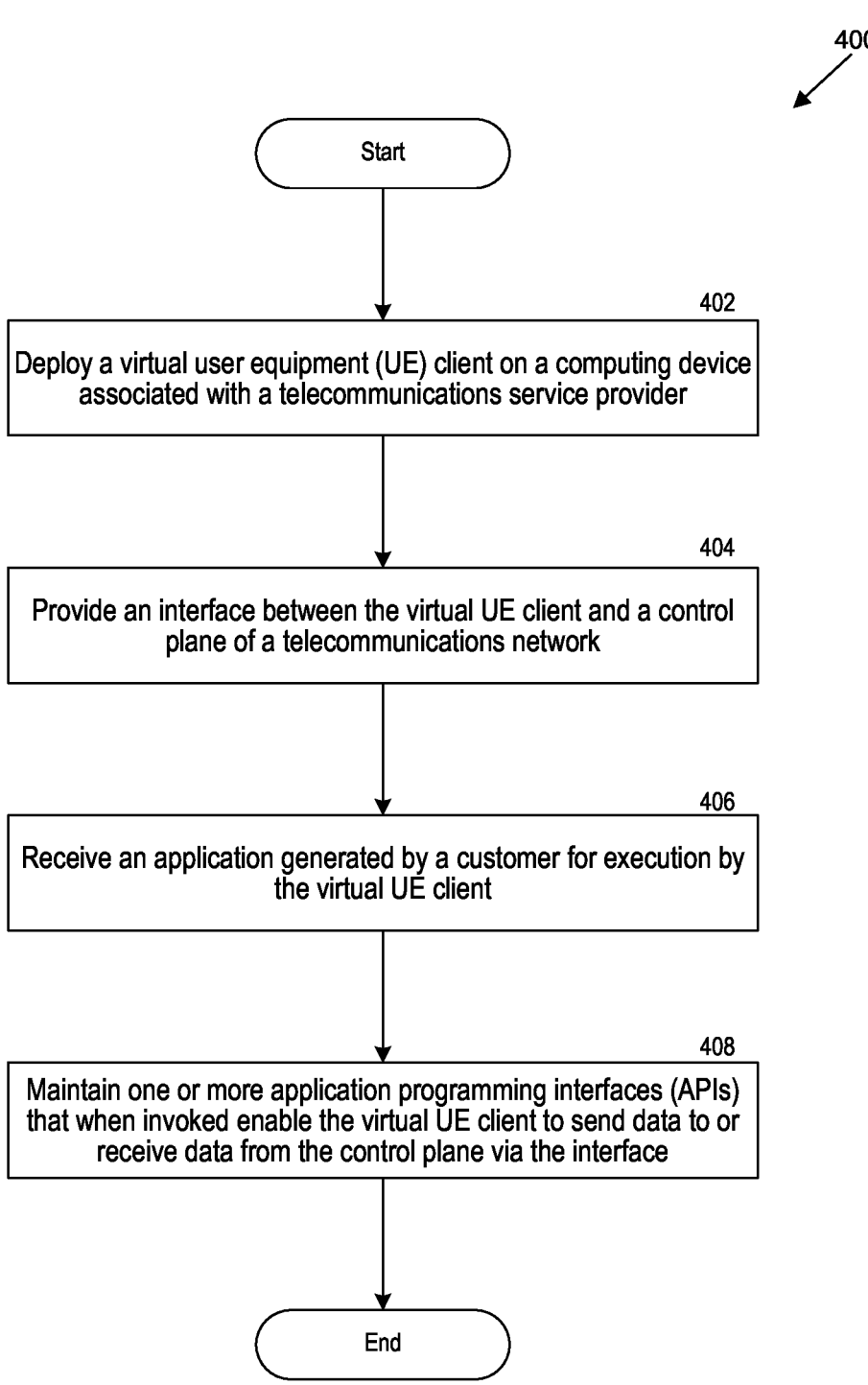
FIG. 4 is a flowchart illustrating a process for hosting user equipment clients, according to some implementations.

FIG. 4 is a flowchart illustrating a process 400 for hosting UE clients, according to some implementations. The process 400 can be performed by systems associated with a telecommunications service provider, such as the lifecycle management subsystem 310 and/or the service management subsystem 320.

In step 402, the system deploys a virtual UE client on a computing device associated with the service provider. The virtual UE client can include computer program instructions that when executed by the computing device cause the computing device to perform one or more functions simulating performance of a physical UE device.

In step 404, the system provides an interface between the virtual UE client and a control plane of the telecommunications network.

In step 406, the system receives an application generated by a customer for execution by the virtual UE client. The application can include instructions that are executable by the computing device on which the virtual UE client is deployed. When executed, these instructions can perform one or more functions using data received from the control plane of the telecommunications network.

In step 408, the system maintains one or more application programming interfaces (APIs) that when invoked enable the virtual UE client to send data to or receive data from the control plane via the interface.

Figure 5:
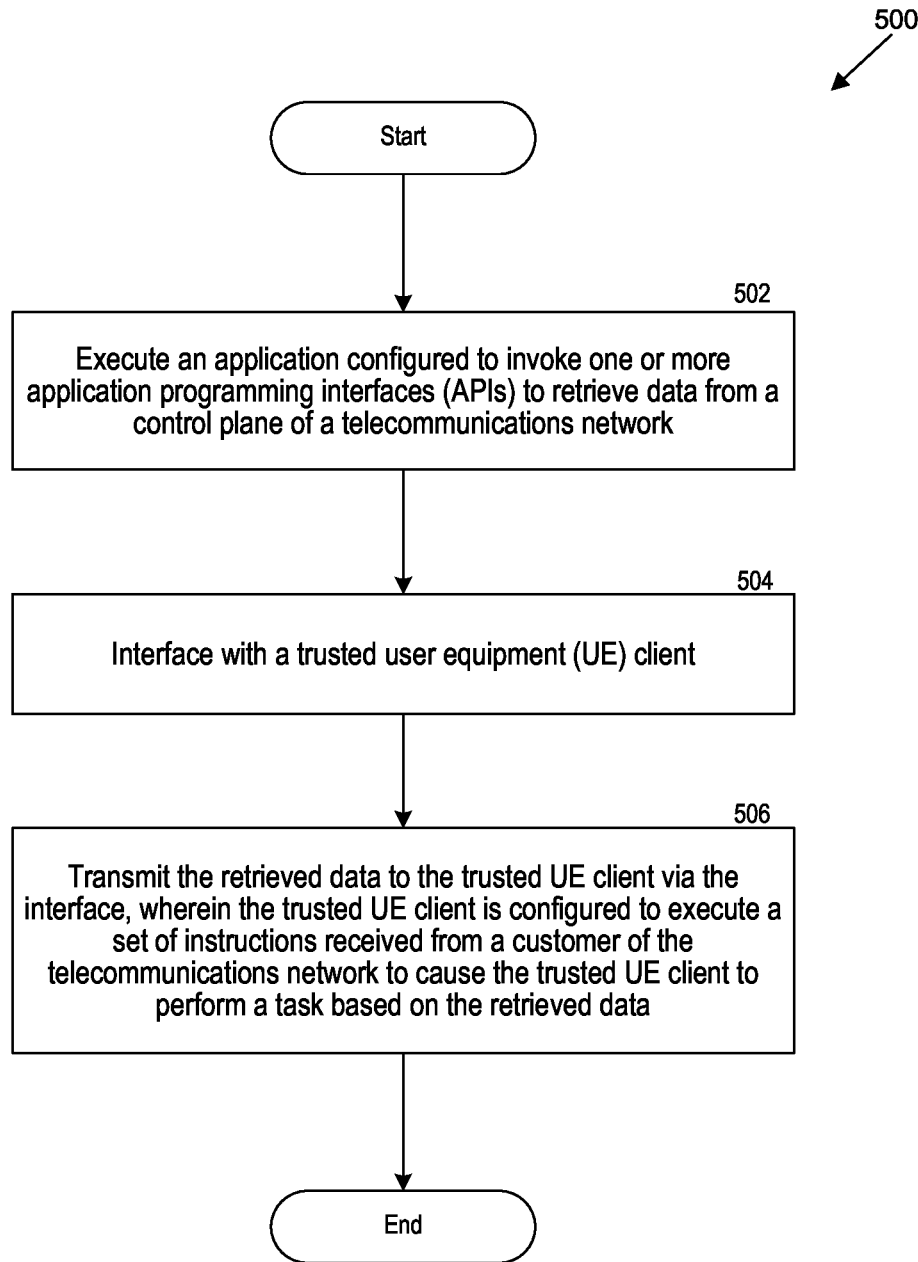
FIG. 5 is a flowchart illustrating a process for communicating data between a trusted UE client and a control plane of a telecommunications network, according to some implementations.

FIG. 5 is a flowchart illustrating a process 500 for communicating data between a trusted UE client and the control plane of the telecommunications network, according to some implementations. The process 500 can be performed by a system associated with the telecommunications service provider, such as the service management subsystem 320.

In step 502, the system executes an application configured to invoke one or more application programming interfaces (APIs) to retrieve data from the control plane of a telecommunications network.

In step 504, the system interfaces with a trusted UE client, such as a virtual client hosted by the service provider or a client operating on a trusted network.

In step 506, the system transmits the data retrieved from the control plane to the trusted UE client via the interface. Using the retrieved data, the UE client can execute a set of instructions received from a customer to cause the client to perform a task.

In an example use case of the hosted UE clients 315 and supporting infrastructure described with respect to FIGS. 3-5, the customer is a company that manages vehicles deployed to various geographic locations (e.g., to deliver goods, perform maintenance, or the like). Each vehicle is associated with a UE device such as an IOT device or a mobile device used by an operator of the vehicle. To assist with monitoring the locations of the company's vehicles, the company develops an application 317 that is configured to receive the location of the UEs associated with the vehicles from the control plane 330. For example, if a vehicle moves outside an expected area, the control plane alerts the hosted UE client 315 of the remote UE 340's location (vehicle location). The hosted UE client 315 can perform an action in response to the alert, such as recording the location change to the customer's tracking system or sending a notification to a designated device (such as a device associated with the vehicle driver's supervisor). By retrieving location data directly from the control plane 330, the hosted UE client 315 can provide more reliable notification of a vehicle's change of location than a remote device that receives such notifications over an access network. If, for example, the device that detects location changes is reliant upon an access network to receive location data of the vehicles' UEs, the device may not receive such notifications if the device temporarily loses its connection to the access network. Similarly, retrieving the location data directly from the control plane can help ensure that the data remains more private than can be guaranteed if it were to be transmitted over an access network to remote, possibly untrusted devices.

In another example, a customer develops an application 317 to monitor critical data measured by remote IOT sensor devices, such as sensors deployed to measure ground movement as part of an earthquake warning system. The hosted UE client 315 receives data measured by the IOT sensor devices directly from the control plane 330. If the sensor devices measure a parameter that is outside a specified range of values (e.g., ground motion above a threshold), the hosted UE client 315 can transmit a notification to applicable remote devices (such as sending a push notification to mobile devices of any person within a specified distance of the detected ground motion to alert the recipients to an earthquake, or sending a notification that causes certain sensitive equipment to automatically shut off). Because the hosted UE client 315 receives the sensor data directly from the control plane 330, client 315 can receive the sensor data more quickly than a device remote from the control plane because the communication is not limited by network latency that would slow the transmission of sensor data between the remote device and the control plane. Accordingly, the hosted UE client 315 can detect the parameter measured by the sensor data is outside of the specified range of values and take appropriate action more rapidly than can a remote device. In the case of the earthquake warning system, for example, the improved speed of earthquake detection facilitated by the hosted UE client 315 may allow more time for people to reach a safe location or sensitive systems to be safely powered down before the earthquake arrives.

In another example, a customer deploys an application 317 to reduce the number of packages delivered to the wrong address. The customer deploys a solution to notify a delivery driver of problems before the driver has left the location. When a delivery driver exits his truck with a package, the driver's UE client 340 sends a message to a service in 322 that triggers the control plan 330 to send the delivery truck location data directly from the control plane 330 to the application 317 hosted by UE client 315. If the location data is outside a specified range, the application 317 transmits a notification to the UE client 340 indicating that the location does not match the package destination giving the driver a chance to review the delivery. If the truck is within range, the application 317 uses the control plane to commands another UE client 340 on the truck to collect and transmit a series of photographs back to the application 317 using the data plane. The application 317 performs image processing to identify the driver and location features and compares to reference photographs from a generic reference data base or from previous deliveries at or near the location. If the application 317 determines that the driver is at a known but incorrect address, the application 317 transmits a notification to the driver operating UE client 340 indicating that the location does not match the package destination giving the driver a chance to review the delivery. If image processing by application 317 identifies an address in the photographs and determines that the driver is at an incorrect address, the application 317 transmits a notification to the driver operating a UE client 340 indicating that the location does not match the package destination giving the driver a chance to review the delivery.

Computer System

Figure 6:
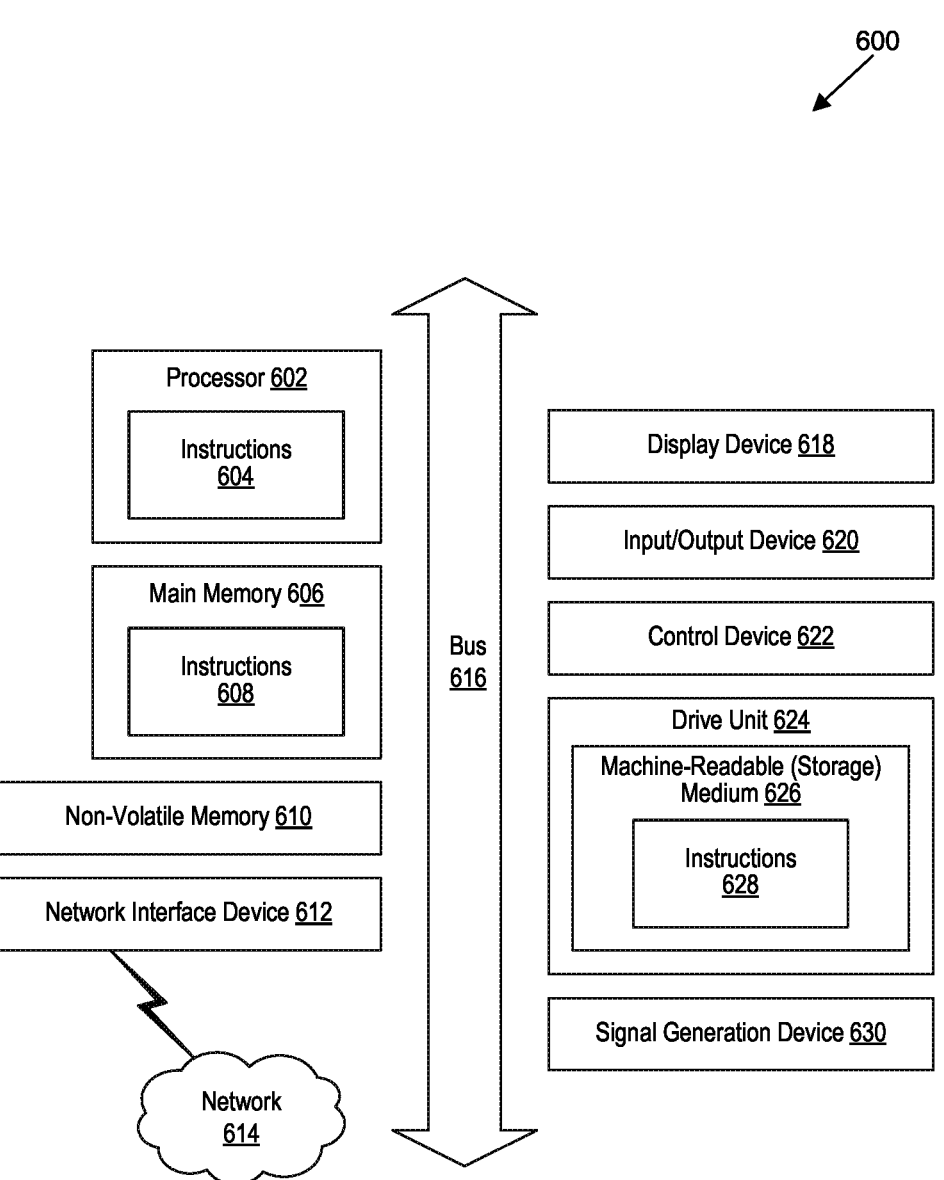
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computer-readable storage medium, excluding transitory signals and carrying instructions, which, when executed by at least one data processor of a system, cause the system to:

responsive to execution of a trusted application on a computing device that is selected from a plurality of computing devices of the system based on a predicted utilization of computing resources required to execute the trusted application, selectively retrieve, from a control plane of a telecommunications network, a first information associated with a remote user equipment device, wherein the control plane performs signaling that establishes and maintains access to services in the telecommunications network;

selectively process information selected by the system, from the first information associated with the remote user equipment device and a second information associated with the computing device, to generate an output in response to the trusted application accessing the information based on a specification of one or more first information types of the first information and one or more second information types of the second information; and communicate the output generated by the trusted application to a remote client over a network.

2. The computer-readable storage medium of claim 1, wherein the instructions further cause the system to:

execute a control interface application that is configured to retrieve the information associated with the remote user equipment device from the control plane and to transmit the retrieved information to the trusted application.

3. The computer-readable storage medium of claim 1, wherein selectively retrieving the information associated with the remote user equipment device comprises:

receiving a stream of data associated with the remote user equipment device from the control plane; and filtering the stream of data to select the information associated with the remote user equipment device that is provided to the trusted application.

4. The computer-readable storage medium of claim 1, wherein providing the information associated with the remote user equipment device to the trusted application comprises:

facilitating communications between the trusted application and an application management function (AMF) of a 5th Generation New Radio (5G NR) telecommunications network via an N1 interface.

5. The computer-readable storage medium of claim 1, wherein the information associated with the remote user equipment device comprises:

a location of the remote user equipment device;

a status of the remote user equipment device; or data associated with telecommunications traffic to or from the remote user equipment device.

6. The computer-readable storage medium of claim 1, wherein the computing device comprises a dedicated server coupled to a trusted access network associated with a service provider of the telecommunications network.

7. The computer-readable storage medium of claim 1, wherein the computing device comprises a mobile device that is coupled to a trusted access network associated with a service provider of the telecommunications network and that is not the remote user equipment device.

8. The computer-readable storage medium of claim 1, wherein the computing device comprises a computing device located within a physical environment maintained by an entity associated with a service provider of the telecommunications network.

9. The computer-readable storage medium of claim 1, wherein the computing device is associated with the telecommunications network, and wherein providing the information associated with the remote user equipment device to the trusted application executed by the computing device comprises communicating the information over a local network.

10. A method comprising:

responsive to execution of a trusted application that is deployed on a computing device of a service management system, selectively retrieving, from a control plane of a telecommunications network, a first information associated with a remote user equipment device, wherein the control plane performs signaling that establishes and maintains access to services in the telecommunications network;

selectively processing information selected by the service management system from the first information associated with the remote user equipment device and a second information associated with the computing device to generate an output in response to the trusted application accessing the information based on a specification of one or more first information types of the first information and one or more second information types of the second information; and communicate the output generated by the trusted application to a remote client over a network.

11. The method of claim 10, further comprising:

executing, by the service management system, a control interface application that is configured to retrieve the information associated with the remote user equipment device from the control plane and to transmit the retrieved information to the trusted application.

12. The method of claim 10, wherein selectively retrieving the information associated with the remote user equipment device comprises:

receiving a stream of data associated with the remote user equipment device from the control plane; and filtering the stream of data to select the information associated with the remote user equipment device that is provided to the trusted application.

13. The method of claim 10, wherein providing the information associated with the remote user equipment device to the trusted application comprises:

facilitating communications between the trusted application and an application management function (AMF) of a 5th Generation New Radio (5G NR) telecommunications network via an N1 interface.

14. The method of claim 10, wherein the information associated with the remote user equipment device comprises:

a location of the remote user equipment device;

a status of the remote user equipment device; or data associated with telecommunications traffic to or from the remote user equipment device.

15. The method of claim 10, wherein the computing device comprises a dedicated server coupled to a trusted access network associated with a service provider of the telecommunications network.

16. The method of claim 10, wherein the computing device comprises a mobile device that is coupled to a trusted access network associated with a service provider of the telecommunications network and that is not the remote user equipment device.

17. The method of claim 10, wherein the computing device comprises a computing device located within a physical environment maintained by an entity associated with a service provider of the telecommunications network.

18. A system comprising:

at least one hardware processor; and at least one non-transitory memory storing instructions, which, when executed by the hardware processor, cause the system to:

responsive to execution of a trusted application that is deployed on a computing device of the system, selectively retrieve, from a control plane of a telecommunications network, a first information associated with at least one remote user equipment device, wherein the control plane performs signaling that establishes and maintains access to services in the telecommunications network;

selectively process information selected by the system, from the first information associated with the at least one remote user equipment device and a second information associated with the computing device, to generate an output in response to the trusted application accessing the information based on a specification of one or more first information types of the first information and one or more second information types of the second information; and communicate the output generated by the trusted application to a remote client over a network.

19. The system of claim 18, wherein the instructions further cause the system to:

execute a control interface application that is configured to retrieve the information associated with the remote user equipment device from the control plane and to transmit the retrieved information to the trusted application.

20. The system of claim 18, wherein the information associated with the remote user equipment device comprises:

a location of the remote user equipment device;

a status of the remote user equipment device; or data associated with telecommunications traffic to or from the remote user equipment device.

* * * * *